Dec. 22, 1970   J. F. NORTON   3,549,999
METHOD AND APPARATUS FOR TESTING CIRCUITS BY MEASURING
SECONDARY EMISSION ELECTRONS GENERATED BY ELECTRON
BEAM BOMBARDMENT OF THE PULSED CIRCUIT
Filed June 5, 1968                                4 Sheets-Sheet 1

Inventor:
James F. Norton,
by Marvin Snyder
His Attorney.

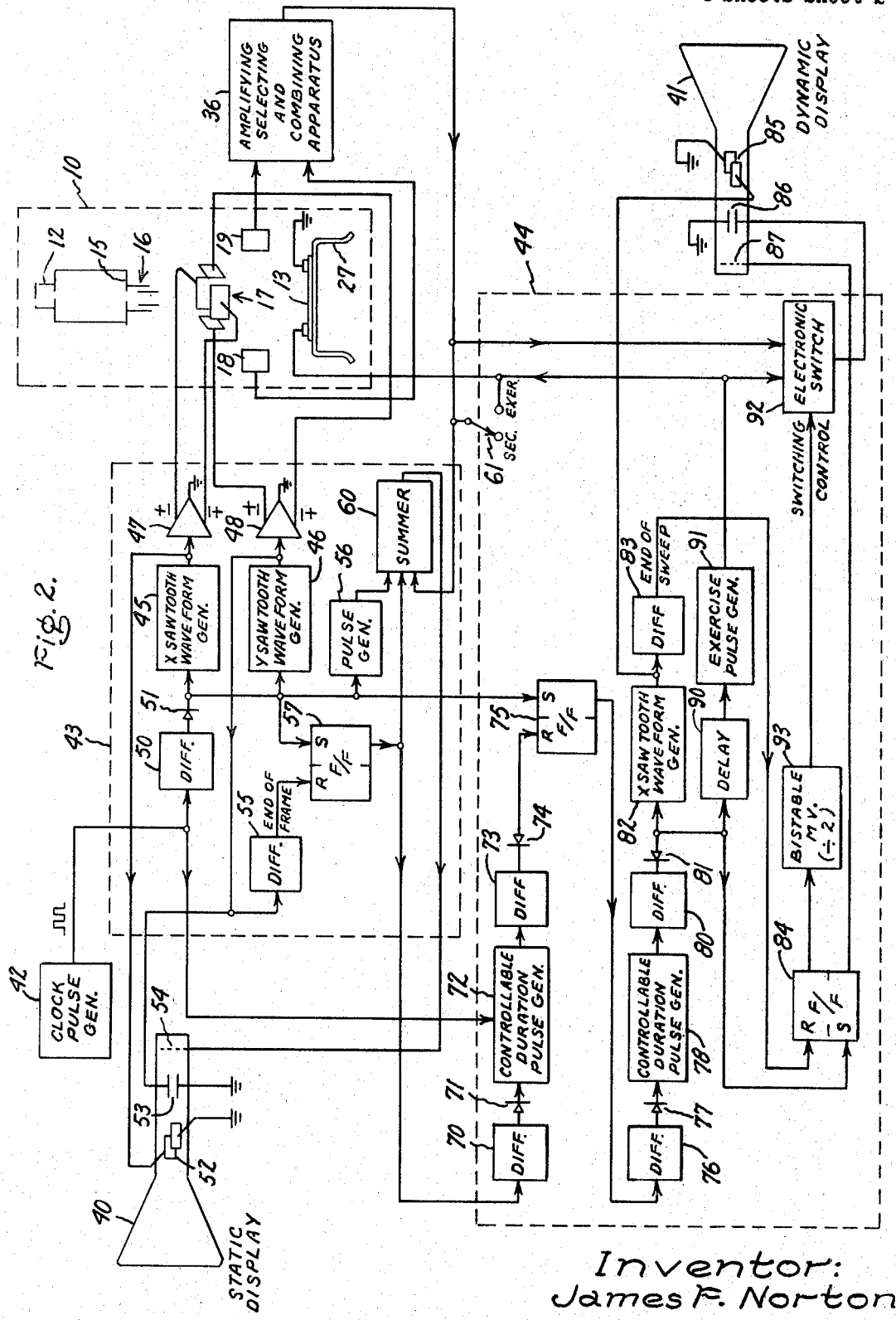

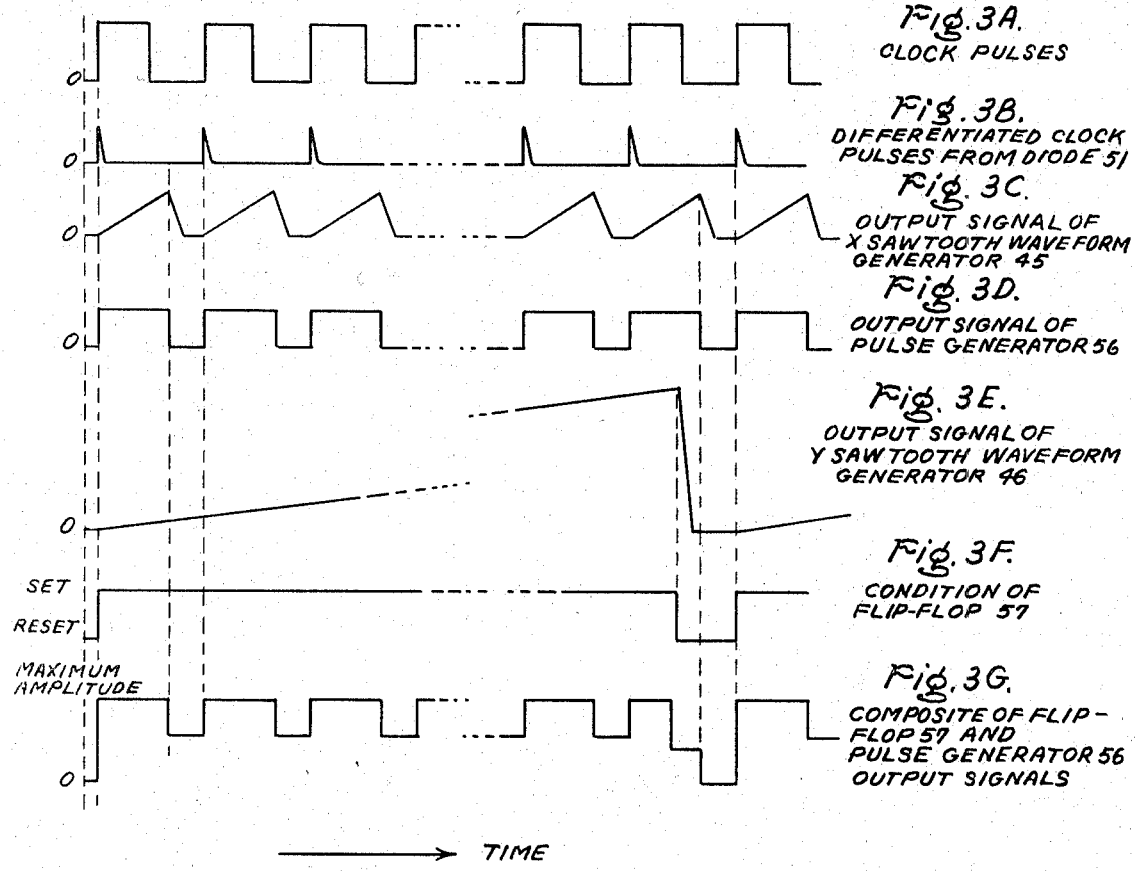

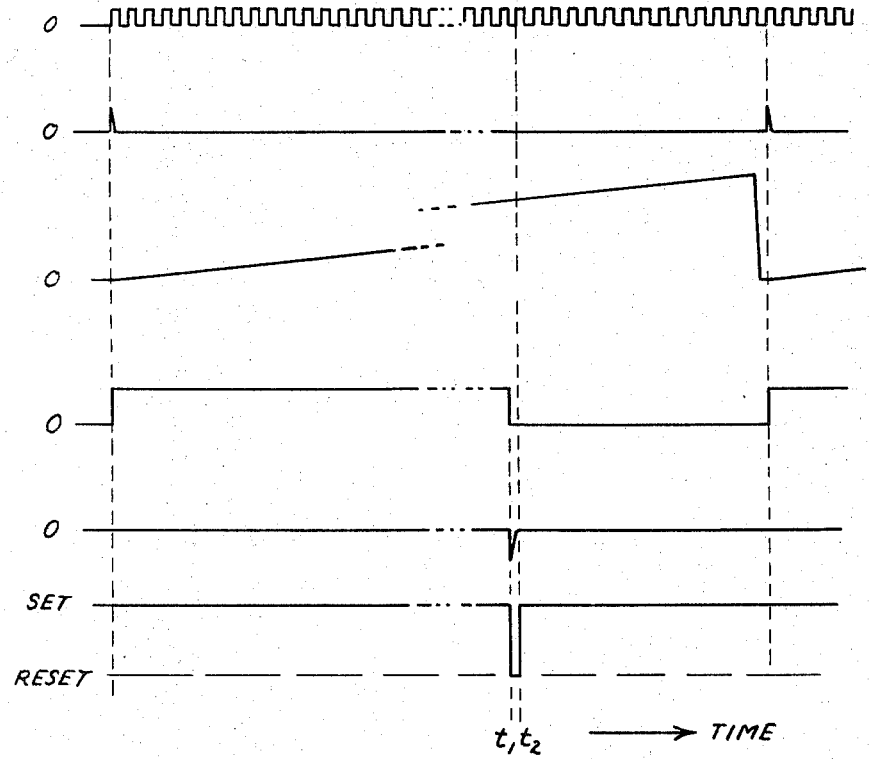
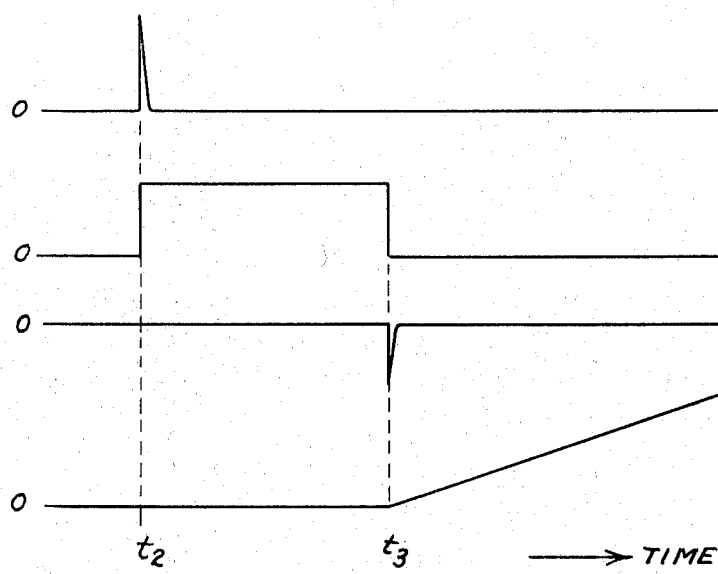

United States Patent Office 3,549,999
Patented Dec. 22, 1970

3,549,999
METHOD AND APPARATUS FOR TESTING CIRCUITS BY MEASURING SECONDARY EMISSION ELECTRONS GENERATED BY ELECTRON BEAM BOMBARDMENT OF THE PULSED CIRCUIT
James F. Norton, Alplaus, N.Y., assignor to General Electric Company, a corporation of New York
Filed June 5, 1968, Ser. No. 734,738
Int. Cl. G01r 31/22, 31/02
U.S. Cl. 324—158                        35 Claims

ABSTRACT OF THE DISCLOSURE

Integrated circuits are tested by energizing the circuits with input pulses, scanning an electron beam over the circuits, and detecting variations in secondary emission caused by influence of integrated circuit voltages upon the low voltage secondary electrons. Electron beam potential is adjusted to a value such that a single electron from the primary scanning electron beam landing on the circuit causes a single secondary electron to leave the circuit. Data may thus be obtained to indicate whether voltages at various points in the circuit are correct or incorrect. Transient response at any point on the circuit may be obtained by observing secondary emission as a function of time during each brief interval in which the electron beam scans over that point while coincidentally applying the input pulses to the circuit.

INTRODUCTION

This invention relates to electronic circuit testing, and more particularly to a method and apparatus for testing integrated circuits with a probing electron beam.

Diagnosis of faulty operation of integrated circuits, as well as measurement of ranges of voltage and limitations of environment within which the circuits will operate, are steps which must be taken in evaluating manufactured integrated circuits prior to their full-scale production. Similarly, quality assurance in a large scale array of integrated circuits must also be made in circuit production operations. With circuits using individual transistors and components, measurement of high frequency voltage waveforms and static voltages can be made with oscilloscopes and mechanical probes. On the other hand, integrated circuit chips with their minute physical dimensions are difficult to measure with mechanical microprobe techniques, due to the difficulties involved in positioning the probe to make contact with the integrated circuit at the proper location. Moreover, integrated circuit chips are often covered with a rugged dielectric material, which is diffifficult to pierce; in fact, by piercing such protective coatings, defects may actually be induced in the circuit. Electronic limitations on mechanical microprobe techniques also exist, since integrated circuits must frequently operate at nanosecond speeds and shunt circuit impedances often greater than 1 megohm, so that the mechanical probes themselves may excessively disturb the measurement. Since typical shunt capacitances are less than 0.1 picofarad, it is especially difficult to measure rise and fall times of waveforms in the nanosecond range using mechanical microprobe techniques.

Scanning electron microscopes previously have been used to map steady-state surface potentials of an integrated circuit chip. This has been accomplished in the presence of a fixed integrated circuit input potential by making a single slow raster scan across the area to be mapped and recording the results on photographic film. Utility of this type of operation is limited both by the fact that variations of surface potential during occurrence of external circuit commands cannot be continuously viewed, and by the fact that scanning electron microscopes are incapable of measuring waveforms.

By utilizing electron beams and secondary emission effects, the present invention permits probing of dynamic circuit voltages by detecting their corresponding surface electric fields. The electron beam is resolved into a small area spot and impinges on an integrated circuit at low landing energy and relatively large beam current, so that a single circuit point can be selected by the scanning beam. The high beam current produces clear oscillograms of even very high frequency circuit waveforms. Changes in surface potential due to the electron beam probing the integrated circuit are minimized because of the low landing potential which is selected to produce one secondary electron for one landing or primary electron. Consequently, substantially no net change in electric charge on the integrated circuit occurs, so that the surface potential across the integrated circuit remains substantially unchanged. Changes in circuit potentials are indicated by monitoring variation in direction of the secondary electrons; that is, since the secondary electrons are at low energies, as is well-known in the art, their paths are strongly influenced by the electric fields of the integrated circuit. Only those secondary electrons following a predetermined path are accelerated into a detector and, after amplification, are measured in utilization apparatus. It should be noted that although the invention is described herein as being applied to testing of integrated circuits, the principles taught herein are applicable to testing of other circuits as well.

Accordingly, one object of the invention is to provide a method and apparatus for probing voltages on minute surface areas.

Another object is to provide a method and apparatus for measuring dynamic circuit potentials at very wide band-widths without disturbing circuit operation or damaging the circuits in any way.

Another object is to provide a method and apparatus for probing a circuit with a low voltage electron beam so as to minimize contamination build-up on the surface of the circuit.

Another object is to provide a method and apparatus for continuously mapping surface potentials of an integrated circuit in real time.

Another object is to provide a method and apparatus for probing an integrated circuit with an electron beam without appreciably charging the surface of the integrated circuit or raising the temperature of the integrated circuit excessively.

Briefly, in accordance with a preferred embodiment of the invention, a method of testing integrated circuits is described. This method comprises energizing the integrated circuit with a pulsating input potential, and directing at predetermined sites on the integrated circuit an electron beam having sufficient energy to produce a desired yield of secondary electrons. Changes in the rate at which secondary emission electrons emanate from the integrated circuit are then detected, and the cathode ray of a cathode ray tube is deflected in accordance with a voltage derived from the detected secondary emission electrons.

In accordance with another preferred embodiment of the invention, apparatus for testing integrated circuits by impingement of an electron beam thereon is described. This apparatus comprises a source of electrons, means directing electrons from the source onto a surface of the integrated circuit being tested, means applying a pulsating input potential to the integrated circuit being tested, and electron detector means positioned to intercept at least a portion of secondary emission electrons emanating from the surface. Cathode ray tube display means for monitoring performance of the integrated circuit undergoing test are also provided. Means are provided for synchronizing displacement of a cathode ray in the cathode ray tube display means to displacement of the electron beam over the surface of the integrated circuit undergoing test, and means are further provided for modulating intensity of the image presented on the cathode ray tube display means in accordance with the rate at which secondary emission electrons are intercepted by the electron detector means.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 2 is a block diagram of a system incorporating the instant invention; and

FIGS. 3A–3G, 4A–4F and 5A–5D are waveforms used to assist in the description of the invention.

DESCRIPTION OF TYPICAL EMBODIMENTS

Figure 1:
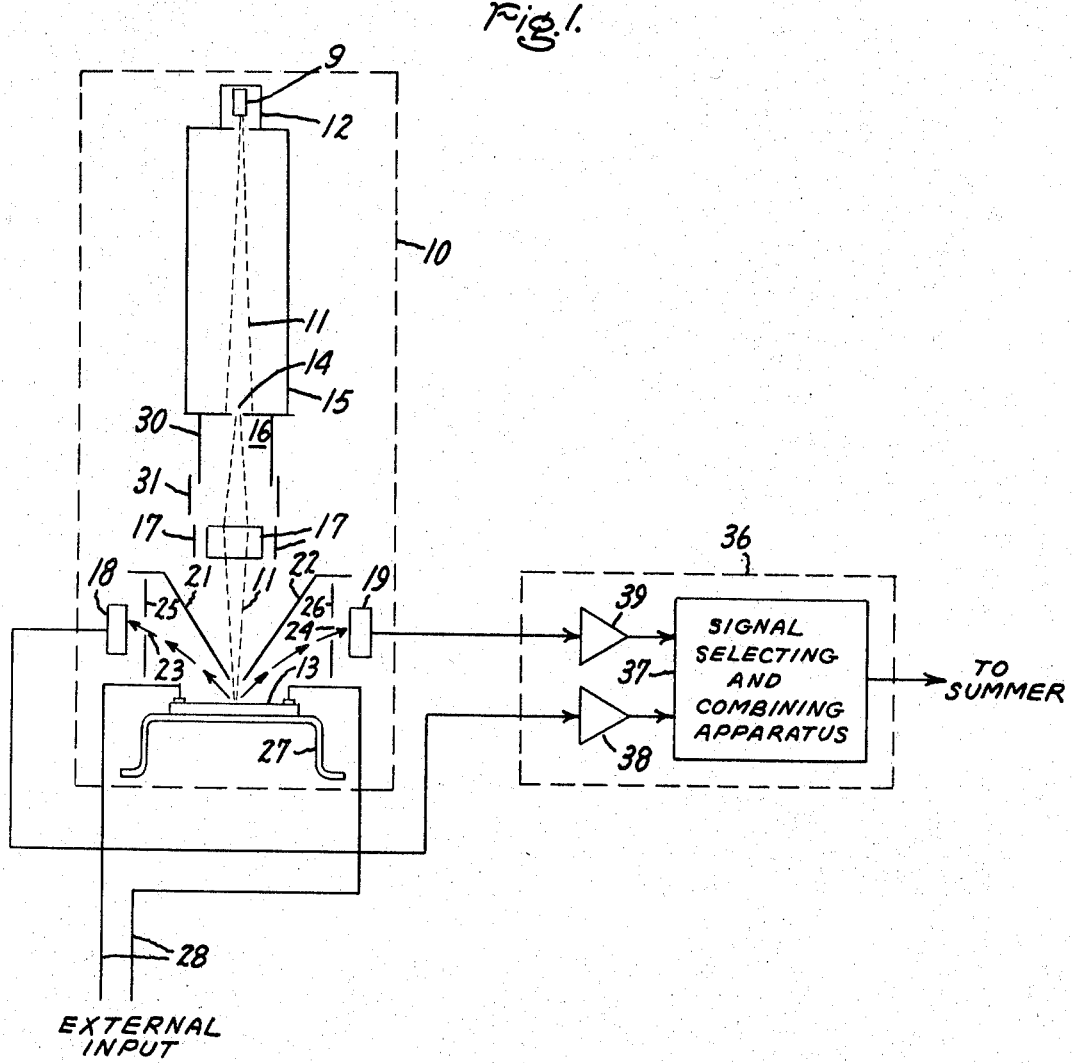
FIG. 1 is a schematic diagram illustrating electron paths in the apparatus of the present invention, together with a portion of utilization apparatus connected thereto.

In FIG. 1, an evacuated chamber 10 is shown schematically in which an electron beam 11 originating from cathode 9 of an electron gun 12 is made to impinge upon an integrated circuit 13. Cathode 9 may comprise a lanthanum boride electron emitter of the type shown and described in W. C. Hughes et al. application Ser. No. 534,345, filed Mar. 15, 1966 and assigned to the instant assignee. The integrated circuit may be formed on a silicon chip, and may either be exposed to view or covered with a thin nonconductive coating such as a silicon oxide passivation layer. The beam is narrowed through a limiting aperture 14 at one end of a tubular electrostatic shield 15 and is focused by an electrostatic lens 16 comprising a pair of telescoped, tubular sections 30 and 31. Deflection of the electron beam is accomplished by two pairs of mutually orthogonal electrostatic deflection plates 17, with the plates of each pair being parallel to each other. Thus, the rearmost plate of one pair is shown in full and the plates of the other pair are shown in side view. Alternatively, either electrostatic lens 16 and electrostatic deflection plates 17, or both, may comprise electromagnetic means if preferred. Integrated circuit 13 may be mounted on a support 27 and externally driven through a pair of input leads 28. In addition, other potentials are applied through other leads (not shown).

A pair of electron detectors 18 and 19 are positioned on either side of the site on the surface of integrated circuit 13 struck by electron beam 11 so as to intercept secondary emission electrons emanating from the integrated circuit surface. Detectors suitable for this application include those semiconductor devices of the class designated nuclear radiation detectors or particle detectors. Stray electrons from beam 11 are prevented from striking detectors 18 and 19 and giving rise to spurious signals by a pair of isolating slats 21 and 22 respectively. In addition, the secondary emission electron paths to which detectors 18 and 19 are responsive are made narrow by virtue of a rectangular slot 23 and 24 respectively in a plate 25 and 26 respectively positioned ahead of each of the detectors. Thus, shifts in the direction of paths traversed by secondary emission electrons affect output signals produced by the detectors.

Typical biases employed in the apparatus shown in FIG. 1 include a potential of −850 volts applied to cathode 9 of electron gun 12, while the electron gun enclosure itself is operated at a potential of about +6,000 volts with respect to cathode 9. The relatively low potential of electrons landing on integrated circuit 13, being at an amplitude of about −850 volts, avoids detrimentally overheating the integrated circuit, while still producing a yield of one secondary emission electron for each primary electron striking integrated circuit 13. Criteria for selecting primary electron energy to produce a desired yield of secondary emission electrons are presented in Secondary Electron Emission by N. R. Whetten, Handbook of Chemistry and Physics, 47th ed. (1966–1967) page E145 published by The Chemical Rubber Company, Cleveland, Ohio.

Section 30 of electron lens 6 and tubular electrostatic shield 15 are operated at the potential of the enclosure of electron gun 12 in order to provide a field-free region for electrons of electron beam 11 by isolating the electrons from the field of the casing of chamber 10. The casing of chamber 10 and support member 27 are both operated at ground potential. Section 31 of lens 16 defines a decelerating region for electrons of beam 11, and is operated at approximately ground potential. Insulating slats 21 and 22 are operated at a potential of about +3 volts. Similarly, slotted plates 25 and 26 may be operated at the same potential as slats 21 and 22, in order to ensure optimum collection of secondary emission electrons by detectors 18 and 19. Detectors 18 and 19 themselves, are operated at a voltage in the range of +5,000 to +10,000 volts, in order to ensure collection of the secondary emission electrons by the detectors and current multiplication within the detectors themselves. By employment of the aforementioned bias potentials, a primary electron beam having beam current of 0.5 microamp may be focused to a spot of about 5 microns in diameter and may also be swept over an integrated circuit target at a high rate of speed. Since most of the secondary emission electrons are at energies of less than 10 volts, these electrons are accelerated in the range of +5,000 to +10,000 volts by the potential applied to the detectors 18 and 19, enabling them to impinge upon these detectors. Typically, these detectors comprise large area, silicon p-n junction type detectors, such as back-biased, double diffused junction diodes. With this apparatus, current gains of 1,000 at band widths of at least 150 mHz. may be achieved.

Output signals from detectors 18 and 19 are applied to inputs of amplifying, selecting and combining apparatus 36. This apparatus includes a pair of amplifiers 38 and 39 connected to the outputs of detectors 18 and 19 respectively. Output signals from amplifiers 38 and 39 are furnished to switching apparatus 37, designated signal selecting and combining apparatus. The signal selecting and combining apparatus may be selectively operated to provide to a summer circuit output signals which may comprise the output signals of detector 18 and 19 separately, the sum of the output signals of detectors 18 and 19, or the difference between the output signals of detectors 18 and 19. Circuitry for accomplishing such signal selecting and/or combining is well-know in the art and hence not described herein.

In operation, primary electrons impinge upon integrated circuit 13, causing secondary emission electrons to emanate from circuit 13 along paths such as indicated by the arrows and be collected by detectors 18 and 19. As long as electric fields produced by the circuitry of integrated circuit 13 remain constant, the rate of electrons, or number of electrons per unit of time, striking each of detectors 18 and 19 as a result of beam 11 impinging on any predetermined site on integrated circuit 13 remains constant. However, if the electrical condition of the integrated circuit is altered, such as occurs, for example, if the integrated circuit is a flip-flop circuit and is switched from a SET to a RESET condition, the electric field produced by the integrated circuit is altered, consequently altering the paths of the secondary emission electrons. This results in a change in the number of electrons per unit of time striking each of detectors 18 and 19, and this change can be translated into information regarding the condition of the integrated circuit, in the manner described, infra.

FIG. 2 illustrates the complete system of the instant invention, including the control apparatus connected to deflection plates 17 in chamber 10, the output apparatus connected to detectors 18 and 19 in chamber 10, and the circuitry connected to integrated circuit 13 in the chamber. For purposes of simplifying description, some of the detail shown in FIG. 1 is not repeated in FIG. 2.

The system of FIG. 2 includes a pair of cathode ray tubes 40 and 41, designated static display and dynamic display, respectively, while the entire system itself is synchronized to a clock pulse generator 42. The display presented by static display cathode ray tube 40 is a television type of presention, which produces a form of map of electric potentials existing in the integrated circuit undergoing test while that circuit is energized. Dynamic display cathode ray tube 41 provides an oscilloscope type of trace which permits observation of transient conditions at any given point in the integrated circuit occurring at a time, for example, when the input signal to the integrated circuit is altered. By use of an electronic switch 92, a pair of traces can be displayed on the face of dynamic display cathode ray tube 41, so that the response of the integrated circuit to exercise pulses (i.e. input pulse) may be observed simultaneously with observation of the exercise pulses themselves. The point is examined by continually sweeping over it with the electron beam and by examining secondary emission electrons only at the time the beam strikes that point. Static display cathode ray tube 40 is operated by static display circuitry 43, while dynamic display cathode ray tube 41 is operated by dynamic display circuitry 44.

In the apparatus of FIG. 2, it is assumed that integrated circuit 13 is energized with all proper bias voltages applied thereto. The leads illustrated as being connected to integrated circuit 13 are input signal leads; that is, these leads furnish exercise pulses to the circuit from dynamic display circuitry 44 in the event a dynamic display is desired. For purposes of observing a static display, however, the exercise pulses need not be present; in fact, it may be preferable to omit application of exercise pulses to integrated circuit 13 when a static display is desired, since the exercise pulses may cause momentary distortions in the display produced on the face of cathode ray tube 40. On the other hand, if the exercise pulses are applied to the circuit, they may be displayed on the face of cathode ray tube 40, thereby showing the precise location of the exercise pulses in the displayed raster.

Electron beam scanning within chamber 10 is controlled by a pair of sawtooth waveform generators 45 and 46. Thus, output signals from X sawtooth waveform generator 45 are furnished to an amplifier 47 which supplies a pair of output signals of equal but opposite amplitudes, varying in accordance with the amplitude of the X sawtooth wave, to a first pair of opposed, parallel deflection plates 17, for the purpose of displacing the electron beam in chamber 10 in the X direction. Similarly, output signals from Y sawtooth waveform generator 46 are furnished to a dual output amplifier 48 which is similar to amplifier 47, and the equal but opposite amplitude output signals produced therefrom are supplied to a second pair of parallel, opposed electrostatic deflection plates 17, oriented orthogonally to the first pair, for the purpose of displacing the electron beam in chamber 10 in the Y direction. The X and Y directions in chamber 10 comprise conventional Cartesian coordinates, and are mutually orthogonal in a plane parallel to the plane of integrated circuit 13. Amplifiers 47 and 48 are indicated as having an output center-tap, which is grounded.

Both X sawtooth waveform generator 45 and Y sawtooth waveform generator 46 are triggered into operation by the output signal of a differentiator circuit 50, which receives clock pulses from clock pulse generator 42, through a forward-connected diode 51. Thus, assuming positive clock pulses, both X sawtooth waveform generator 45 and Y sawtooth waveform generator 46 are triggered upon the rise of a first clock pulse. During the fall of each clock pulse, occurrence of a negative differentiated pulse is blocked by rectifier 51.

Output signals from X sawtooth waveform generator 45 are supplied to X deflection plates 52 of cathode ray tube 40, while output signals from Y sawtooth waveform generator 46 are supplied to Y deflection plates 53 of cathode ray tube 40, and to a differentiator circuit 55 which produces an output signal only upon the abrupt fall of the Y sawtooth wave upon completion thereof. The X direction on the faces of cathode ray tubes 40 and 41 is herein taken to be the horizontal direction while the Y direction is taken to be the vertical direction, in conventional Cartesian coordinate manner.

Output signals from differentiator circuit 50 are also furnished through diode 51 to a pulse generator 56 and the SET input, designated S, of a flip-flop circuit 57 which is reset by output signals from differentiator circuit 55 supplied to the RESET input, designated R. Output signals from pulse generator 56 are summed together with output signals from flip-flop circuit 57 when in the SET condition and with output signals from amplifying, selecting and combining apparatus 36 when a switch 61 is in the Sec. position, in an analog summer circuit 60. The output of summer 60 is coupled to grid 54 of cathode ray tube 40.

Dynamic display circuitry 44 is interconnected with static display circuitry 43. Thus, when flip-flop circuit 57 is switched into the SET condition, an output phase is furnished by a differentiator circuit 70 through a forward connected rectifier 71 which passes the output pulse only upon the rise of the output signal from flip-flop circuit 57, to a controllable pulse duration generator 72. Each pulse thus furnished to controllable duration pulse generator 72 triggers the pulse generator to produce an output signal for a predetermined time. Controllable duration pulse generator 72 may conveniently be synchronized to clock pulse generator 42 to maximize timing precision. Upon completion of the output signal from controllable duration pulse generator 72, a differentiator circuit 73 supplies an output pulse through a reverse-connected diode 74 which also serves to block passage of an output pulse occurring during the rise of the output pulse from controllable duration pulse generator 72, to the RESET input, designated R, of a flip-flop circuit 75. Flip-flop circuit 75 is driven into the SET condition by differentiated clock pulses furnished to the SET input thereof, designated S, from diode 51 of static display circuitry 43.

An output pulse from flip-flop circuit 75, upon being driven into the SET condition, is furnished to a differentiator circuit 76 which only then supplies an output pulse through a forward-connected rectifier 77 to a controllable duration pulse generator 78. Each pulse thus furnished to controllable duration pulse generator 78 triggers the pulse generator to produce an output signal of controllable duration and, upon completion of the controllable duration pulse thus produced, a differentiator circuit 80 is triggered into operation so as to furnish an output pulse through a reverse-connected rectifier 81 to an X sawtooth waveform generator 82, a delay circuit or delay line 90, and the SET input, designated S, of a flip-flop circuit 84. Rectifier 81 blocks output pulses from differentiator circuit 80 during the rise of the output pulse from controllable duration pulse generator 78.

Output signals from delay circuit 90 are supplied to an exercise pulse generator 91. Each exercise pulse produced in response to a pulse from delay circuit 90, is furnished both to the input of integrated circuit 13 undergoing test, in order to actuate the circuit, as well as to the first input of a two-input electronic switch 92. Output signals from pulse generator 56 are summed together with output signals from flip-flop circuit 57 when in the SET condition and with output signals from exercise pulse generator 91 when switch 61 is in the Exer. position. Depending upon the type of integrated circuit undergoing test, the pulse produced by pulse generator 91 may be unipolar or bipolar. The second input to electronic switch 92 is fulfilled by output signals from amplifying, selecting and combining apparatus 36.

Each output signal from differentiator circuit 80 triggers X sawtooth waveform generator 82 into operation and, upon completion of each sawtooth wave supplied by generator 82, a differentiator circuit 83 furnishes an output pulse to the RESET input, designated R, of flip-flop circuit 84. These X sawtooth waves are also furnished to X deflection plates 85 of cathode ray tube 41. Output signals from flip-flop circuit 84, when switched in and out of the RESET condition, are supplied to the input of a divide-by-two circuit such as a bistable multivibrator 93, the output of which drives the switching control for electronic switch 92 so as to control the rate of alternating selection of the first and second inputs thereto. Output signals from electronic switch 92 are supplied to Y deflection plates 86 of cathode ray tube 41, while grid 87 of cathode ray tube 41 is energized by the output signal from flip-flop circuit 84 whenever the flip-flop circuit is in the SET condition.

Operation of the apparatus illustrated in FIG. 2 begins upon occurrence of the first clock pulse produced by clock pulse generator 42, and is explained herein in conjunction with FIGS. 3A–3G, 4A–4F and 5A–5D. The clock pulses are illustrated on a common time base in FIG. 3A. The rising portion of each clock pulse is differentiated by differentiator circuit 50 to produce trigger pulses such as those illustrated in FIG. 3B. Each trigger pulse from differentiator circuit 50 triggers X sawtooth waveform generator 45 to produce a train of sawtooth waves such as illustrated in FIG. 3C, and also triggers pulse generator 56 to produce a train of X blanking pulses such as illustrated in FIG. 3D. In addition, the first trigger pulse from differentiator circuit 50 also triggers Y sawtooth waveform generator 56 into operation, thereby initiating the slowly rising, relatively long sawtooth waveform illustrated in FIG. 3E.

Each X sawtooth wave produced by X sawtooth waveform generator 45 sweeps the electron beam in chamber 10 across one complete path over integrated circuit 13 and, being applied to X deflection plates 52 of cathode ray tube 40, simultaneously sweeps the cathode ray in cathode ray tube 40 across a complete, substantially horizontal line on the face of the tube. The electron beam of chamber 10 and the cathode ray in cathode ray tube 40 are both quickly returned to their horizontal or X starting positions by the steep fall of the X sawtooth wave. Upon occurrence of the next X sawtooth wave, both the next path over integrated circuit 13 and the next line on the face of cathode ray tube 40 are advanced in a direction substantially orthogonal to the previous line, due to the increasing Y deflection voltage from Y sawtooth waveform generator 46 appearing on a pair of opposed parallel deflection plates of electrostatic deflection means 17 and on Y deflection plates 53 of cathode ray tube 40. In this fashion, the electron beam sweeps a raster over integrated circuit 13, and the cathode ray of cathode ray tube 40 simultaneously generates a raster on the face of tube 40.

At the end of each complete raster, the steep fall of the Y sawtooth wave is differentiated by differentiator circuit 55 into a sharp pulse signifying the end of a frame. Flip-flop circuit 57, which upon initiation of the sawtooth waveform illustrated in FIG. 3E is triggered into its SET condition to produce a steady output signal, is thus driven into its RESET condition as indicated in FIG. 3F, terminating the output signal therefrom. The waveform illustrated in FIG. 3G thus represents a composite blanking signal which comprises the sum of output signals from flip-flop circuit 57 and pulse generator 56 and which, with switch 61 in the Sec. position, is applied to grid 54 of cathode ray tube 40 in combination with the output signal from amplifying, selecting and combining apparatus 36. It should be noted that upon completion of the pulse from pulse generator 56, occurring at the time the Y sawtooth wave reaches its maximum, the composite blanking signal shown in FIG. 3G falls to zero and remains at zero until occurrence of the next trigger pulse from differentiator 50 initiated by the rise of the next-occurring clock pulse.

With switch 61 in the Sec. position, output signals furnished from amplifying, selecting and combining apparatus 36 are algebraically added to the composite blanking signal supplied to analog summer 60 from pulse generator 56 and flip-flop circuit 57. By making the maximum amplitude of the blanking signal shown in FIG. 3G a value just below the threshold value required to illuminate the face of cathode ray tube 40, illumination of the cathode ray tube face occurs only when a signal is produced by apparatus 36 during occurrence of the maximum blanking signal. The signal produced by apparatus 36 may comprise the output signal of detector 18 alone, detector 19 alone, detectors 18 and 19 in additive combination, or detectors 18 and 19 in subtractive combination, as described in conjunction with FIG. 1. Whatever the choice, a video signal is thus applied to grid 54 of cathode ray tube 40 and, in conjunction with the horizontal and vertical sweep signals on deflection plates 52 and 53 respectively, a television type of presentation appears on the face of cathode ray tube 40 and comprises a map of the electric potentials in the area of integrated circuit 13 scanned by the electron beam in chamber 10.

In the event the electric potentials on integrated circuit 13 are altered, as by applying an input or exercise pulse to integrated circuit 13, the change in condition of the integrated circuit is visually displayed on the face of cathode ray tube 40, provided the changed condition is either retained for more than merely a transient interval or repeatedly produced. For example, if the integrated circuit is a flip-flop circuit, the exercise pulse may switch the circuit from a SET condition to a RESET condition. If the integrated circuit thereafter remains in the RESET condition, this new condition of the circuit will thereafter be observed on the face of cathode ray tube 40. However, the change itself, at any given point on the circuit, if sufficiently rapid, is difficult to observe on the display of cathode ray tube 40, even if a bipolar exercise pulse is employed to switch the circuit from a SET condition to a RESET condition and back to a SET condition. In order to observe this change in detail, the dynamic display presentation of cathode ray tube 41 is provided.

It should be noted that application of a step input voltage to the integrated circuit momentarily produces a higher than normal contrast on the face of cathode ray tube 40. This high contrast decays to the lesser, normal value in an interval of about a second. This phenomenon is caused by a change in the level of charge on the integrated circuit brought on by application of the step input voltage. Each time the electron beam thereafter scans over the integrated circuit, a portion of this charge is removed by the beam until, after about 100 scans, for example, the change in electrical charge on the integrated circuit caused by application of a step voltage thereto is reduced to a lesser steady-state level. Thus, the high contrast level in the display on the face of cathode ray tube 40 may be conveniently maintained simply by applying an exercise pulse to the circuit once during each raster scanned by the electron beam. Each exercise pulse returns the circuit to its original charge state before sufficient time has elapsed for any significant decay in the charge level to have occurred in the area immediately surrounding the area of the circuit struck by the electron beam during application of the exercise pulse. The next exercise pulse restores the circuits to its charge level which produces a high contrast. Thus the display on the face of cathode ray tube 40 provides an image of higher contrast, at all times, than can otherwise be obtained by examining surface potentials under steady-state input signal conditions.

Operation of dynamic display circuitry 44 is controlled by clock pulse generator 42 and by flip-flop circuit 57 of static display circuitry 43. The clock pulses are illustrated on a common time base in FIG. 4A. Prior to operation, the duration of each output pulse to be produced by each of controllable duration pulse generators 72 and 78 is set according to the desired X line of the raster and position on the X line, respectively, to be examined. When the system is energized, the rise of the first clock pulse from clock pulse generator 42 produces a trigger pulse from differentiator circuit 50, thus ensuring that flip-flop circuit 75 begins operation in its SET condition; however, this has no effect on controllable duration pulse generator 78 due to the presence of forward-connected diode 77. On the other hand, this same first clock pulse, acting through differentiator circuit 50, drives flip-flop circuit 57 into the SET condition. The rise of the output pulse thus produced from flip-flop circuit 57 is differentiated by differentiator circuit 70, resulting in a trigger pulse being applied through forward-connected rectifier 71 to actuate controllable duration pulse generator 72. This trigger pulse, which is illustrated in FIG. 4B, thus demarcates the start of a controlled duration pulse which continues until a predetermined X line of the raster is reached on both static display cathode ray tube 40 and in the area scanned by the electron beam over the surface of integrated circuit 13. The controlled duration pulse initiated by this trigger pulse is illustrated in FIG. 4D. The Y sawtooth wave produced by Y sawtooth waveform generator 46 and illustrated in FIG. 4C is also initiated by this trigger pulse. Presence of reverse-connected rectifier 74 prevents the rise of the output pulse from pulse generator 72 from affecting flip-flop circuit 75.

After the raster has progressed in the Y direction to the predetermined X line as selected by the predetermined timing interval of the output pulse produced by controllable duration pulse generator 72, the output pulse produced by pulse generator 72 ceases. This produces a negative output pulse from differentiator circuit 73, as illustrated in FIG. 4E, which acts through diode 74 to drive flip-flop circuit 75 into the RESET condition. This occurs at time $t_1$ as illustrated in FIG. 4F. When flip-flop circuit 75 is driven into the RESET condition, the output signal supplied from flip-flop circuit 75 to differentiator 76 is terminated, but due to presence of diode 77, this termination has no effect on controllable duration pulse generator 78. However, upon the rise of the next-occurring clock pulse, which occurs at time $t_2$, an output pulse from differentiator 50 returns flip-flop circuit 75 to its SET condition, as illustrated in FIG. 4F. A trigger pulse from differentiator circuit 76 thus acts through diode 77 to actuate controllable duration pulse generator 78. This trigger pulse occurs at time $t_2$, as illustrated along a common, greatly expanded, time base in FIG. 5A. An output pulse is thus initiated from pulse generator 78, as illustrated in FIG. 5B, but this pulse has no effect due to presence of diode 81. Upon completion of the controllable duration pulse from pulse generator 78 however, which occurs at time $t_3$, a negative trigger pulse from differentiator circuit 80 is applied through diode 81 to each of X sawtooth waveform generator 82, delay circuit 90 and the SET input of flip-flop circuit 84. The negative trigger pulse produced by differentiator circuit 80 is illustrated in FIG. 5C.

The negative trigger pulse applied through diode 81 drives X sawtooth waveform generator 82 into operation. Thus, at time $t_3$, this sawtooth waveform generator initiates the sawtooth wave illustrated in FIG. 5D, thereby driving horizontal deflection plates 85 of dynamic display cathode ray tube 41. In addition, after a brief delay introduced by delay circuit 90 to allow the cathode ray of cathode ray tube 41 to sweep slightly toward the center of the face of tube 41 and thus allow viewing thereon of the beginning of the exercise pulse, exercise pulse generator 91 is actuated, furnishing an input pulse to integrated circuit 13 undergoing test and simultaneously supplying the exercise pulse to the first input of electronic switch 92. The second input to electronic switch 92 receives the output signal of amplifying, selecting and combining apparatus 36. The output signal of electronic switch 92 is selected by a switching control signal to be from either exercise pulse generator 91 or apparatus 36, in alternate fashion. The output signal of electronic switch 92 is applied to vertical deflection plates 86 of cathode ray tube 41, so as to deflect the cathode ray in accordance with the amplitude of the alternately applied signals. Each time the output voltage wave of X sawtooth waveform generator 82 drops steeply to its minimum amplitude, differentiator circuit 83 furnishes an output signal, indicative of the end of the horizontal sweep on cathode ray tube 41, to the RESET input of flip-flop circuit 84. Thus flip-flop circuit 84, having been driven into the SET condition at the beginning of each X sawtooth wave produced generator 82, is driven into the RESET condition upon completion of each of these X sawtooth waves.

Output signals produced by the RESET output of flip-flop circuit 84 are supplied to the input of bistable multivibrator 93 so as to divide the number of output pulses produced by flip-flop circuit 84 by two. Accordingly, the switching control signal is applied to electronic switch 92 during alternate sawtooth waves from X sawtooth waveform generator 82, and hence during alternate sweeps of the cathode ray across the face of cathode ray tube 41. Since presence of a switching control signal from bistable multivibrator 93 causes electronic switch 92 to accept one input signal applied thereto, and absence of this switching control signal causes electronic switch 92 to accept the other of the two input signals applied thereto, it is evident that the exercise pulse from exercise pulse generator 91 and the output signal from amplifying, selecting and combining apparatus 36 are applied alternately to Y deflection plates 86 of cathode ray tube 41. Therefore, on each alternate sweep of the cathode ray of cathode ray tube 41, the exercise pulse and the output signal from apparatus 36 are displayed alternately on the face of cathode ray tube 41. Since the switching control signal alternates at a high repetition rate, by employing different biases at the first and second inputs to electronic switch 92, both the exercise pulse and the output signal of apparatus 36 may be displayed essentially simultaneously on the face of cathode ray tube 41, one above the other, in a manner well-known to those skilled in the art.

It should be noted that grid 87 of cathode ray tube 41 is energized to permit production of a display on the face thereof only when flip-flop circuit 84 is in the SET condition. When flip-flop circuit 84 is in the RESET condition, the face of cathode ray tube 41 is blanked out since grid 87 is deenergized at that time. Accordingly, during each horizontal return sweep of its cathode ray, the face of cathode ray tube 41 is dark. It should also be noted that the display produced on the face of cathode ray tube 41 alternates in synchronism with each frame produced on the face of cathode ray tube 40. Thus, with one frame on the face of cathode ray tube 40, the output signal from amplifying, selecting and combining apparatus 36 may be applied to vertical deflection plates 86 of cathode ray tube 41, while during the next frame on the face of cathode ray tube 40, the exercise pulse may be applied to vertical deflection plates 86 of cathode ray tube 41. Hence with each frame produced on the face of cathode ray tube 40, a horizontal trace deflected in the vertical direction according to one of either of two signals is produced on the face of cathode ray tube 41.

By setting switch 61 in the Exer. position, the instant at which the exercise pulse occurs may be checked on the raster displayed on the face of cathode ray tube 40. The output signals from amplifying, selecting and combining apparatus 36 are furnished to cathode ray tube 40 together with the exercise pulse by virtue of this change in switch position so that the exercise pulse is superimposed on the map of integrated circuit potentials displayed thereon. This provides a check on the pulse durations selected from pulse generators 72 and 78, since these durations control positioning of the exercise pulse on the face of cathode ray tube 40.

Because duration of each X sawtooth wave generated by X sawtooth waveform generator 45 of static display circuitry 43 is longer than duration of the X sawtooth wave produced by X sawtooth waveform generator 82, albeit of very brief duration itself, the traces produced on the face of cathode ray tube 41 occur with a magnified horizontal sweep in relation to the horizontal sweep of cathode ray tube 40. This permits observation of the signal at a predetermined point in integrated circuit 13 over a period of time which may be even shorter than 100 nanoseconds duration. Thus, by observing the face of cathode ray tube 41, the effect of repetitive application of exercise pulses from pulse generator 91 to integrated circuit 13 may be observed at any selected point on the integrated circuit and over a very brief time interval. The effect on integrated circuit 13 of changing parameters of the exercise pulses may also be conveniently observed in this manner.

The foregoing describes a method and apparatus for probing voltages on minute surface areas and for measuring dynamic potentials on integrated circuits at very wide bandwidths without disturbing operation of the integrated circuits or damaging the integrated circuits in any way. The integrated circuits may be conveniently probed with an electron beam without raising the temperature of the integrated circuits excessively. In addition, surface potentials of the integrated circuits may be continuously mapped in real time in this fashion. Moreover, although the invention has been described for testing of integrated circuits, it is clear that the principles taught herein are applicable to testing of other types of circuits as well.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. A method of testing a circuit comprising: energizing said circuit with a pulsating input signal to alter the electric field generated by said circuit, directing an electron beam upon a predetermined site along said circuit with sufficient energy to produce a desired yield of secondary emission electrons from said irradiated site; said secondary emission electrons traversing a path determined by the interaction of said electric field with said secondary emission electrons and detecting changes in the rate at which secondary emission electrons emanate from said circuit along a given path as an indication of the performance of said circuit.

2. The method of claim 1 wherein the step of directing an electron beam upon a predetermined site along said circuit comprises repetitively sweeping said electron beam in raster fashion over said circuit; and further including the step of deflecting the cathode ray of a cathode ray tube in accordance with changes in the rate at which secondary emission electrons are detected.

3. The method of claim 2 wherein said step of energizing said circuit with a pulsating input signal comprises applying an input pulse to said circuit during generation of each raster when said electron beam impinges on said predetermined site.

4. The method of claim 2 wherein said step of deflecting the cathode ray of a cathode ray tube includes applying a horizontal sweep voltage to said cathode ray tube during each raster only at the time said electron beam sweeps over said predetermined site, said horizontal sweep voltage having a duration shorter than the time required to generate each said raster, and said step of energizing said circuit with a pulsating input signal comprises applying an input pulse of shorter duration than said horizontal sweep voltage to said circuit during generation of each raster when said electron beam sweeps over said predetermined site.

5. The method of claim 1 wherein said step of directing an electron beam upon said predetermined site along said circuit comprises repetitively sweeping said electron beam in raster fashion over said circuit and said step of energizing said circuit with a pulsating input signal comprises applying an input pulse to said circuit during generation of each raster when said electron beam impinges on said predetermined site; and further including the step of deflecting the cathode ray of a cathode ray tube in accordance with changes in the rate at which secondary emission electrons are detected by sampling during alternate horizontal sweeps of said cathode ray the voltages of the detected secondary emission electrons and the input pulse respectively, and deflecting said cathode ray in accordance with the sampled voltage.

6. The method of claim 1 wherein said step of detecting changes in the rate at which secondary emission electrons emanate from said circuit comprises detecting at at least one location secondary emission electrons following at least one predetermined path from said circuit, and visually displaying the detected changes in the rate at which said secondary emission electrons emanate from said circuit.

7. A method of testing an integrated circuit comprising: energizing said integrated circuit with a pulsating input signal to alter the electric field generated by said circuit; directing an electron beam upon predetermined sites on said integrated circuit with sufficient intensity to generate secondary emission electrons therefrom; detecting at two separate locations secondary emission electrons following predetermined paths; and determining changes in the rate at which secondary emission electrons are detected at each of said two separate locations resulting from the interaction of said secondary emission electrons with said electric field to provide an indication of performance of said integrated circuit.

8. The method of claim 7 wherein the step of directing an electron beam upon predetermined sites on said integrated circuit comprises repetitively sweeping said electron beam in raster fashion over said integrated circuit, and said step of determining changes in the rate at which secondary emission electrons are detected at each of said two separate locations comprises deflecting the cathode ray of a cathode ray tube in accordance with said changes.

9. The method of claim 7 wherein said step of energizing said integrated circuit with a pulsating input signal comprises applying an input pulse to said circuit when said electron beam impinges on a selected one of said predetermined sites.

10. The method of claim 8 wherein said step of deflecting the cathode ray of a cathode ray tube includes applying a horizontal sweep voltage to said cathode ray tube during each raster only at the time said electron beam sweeps over a selected one of said predetermined sites, said horizontal sweep voltage having a duration shorter than the time required to generate each said raster, and said step of energizing said integrated circuit with a pulsating input signal comprises applying an input pulse of shorter duration than said horizontal sweep voltage to said circuit during generation of each said raster when said electron beam sweeps over said selected one of said predetermined sites.

11. The method of claim 7 wherein said step of directing an electron beam upon predetermined sites on said integrated circuit comprises repetitively sweeping said electron beam in raster fashion over said integrated circuit and said step of energizing said integrated circuit with a pulsating input signal comprises applying an input pulse to said circuit during generation of each raster when said electron beam impinges on a selected one of said predetermined sites; and further including the step of deflecting the cathode ray of a cathode ray tube in accordance with changes in the rate at which secondary emission electrons are detected at each of said two separate locations as an indication of performance of said integrated circuit.

12. The method of claim 7 including the step of deflecting the cathode ray of a cathode ray tube in accordance with the difference in the rates at which secondary emission electrons are detected at said two separate locations.

13. The method of claim 12 wherein the step of directing an electron beam upon predetermined sites on said intgrated circuit comprises repetitively sweeping said electron beam in raster fashion over said integrated circuit; and said step of deflecting the cathode ray of a cathode ray tube includes applying a horizontal sweep voltage to said cathode ray tube during each raster only at the time said electron beam impinges on a selected one of said predetermined sites, said horizontal sweep voltage having a duration shorter than the time required to generate each said raster.

14. The method of claim 12 wherein said step of energizing said integrated circuit with a pulsating input signal comprises applying an input pulse to said circuit when sail electron beam impinges on a selected one of said predetermined sites.

15. The method of claim 13 wherein said step of energizing said integrated circuit with a pulsating input signal comprises applying an input pulse of shorter duration than said horizontal sweep voltage to said circuit during generation of each said raster when said electron beam sweeps over said selected one of said predetermined sites.

16. The method of claim 12 wherein said step of directing an electron beam upon predetermined sites on said integrated circuit comprises repetitively sweeping said electron beam in raster fashion over said integrated circuit; said step of energizing said integrated circuit with a pulsating input signal comprises applying an input pulse to said circuit during generation of each raster when said electron beam impinges on a selected one of said predetermined sites; and said step of deflecting the cathode ray of a cathode ray tube includes the steps of deriving a voltage in accordance with the rate at which secondary emission electrons are detected at each of said two separate locations, sampling during alternate horizontal sweeps of said cathode ray the difference in the voltages derived from the detected secondary emission electrons and the voltage of said input pulse respectively, and deflecting said cathode ray in accordance with the sampled voltages.

17. The method of claim 7 including the step of deflecting the cathode ray of a cathode ray tube in accordance with the sum of the voltages derived from the detected secondary emission electrons at said two separate locations.

18. The method of claim 17 wherein the step of directing an electron beam upon predetermined sites on said integrated circuit comprises repetitively sweeping said electron beam in raster fashion over said integrated circuit; and said step of deflecting the cathode ray of a cathode ray tube includes applying a horizontal sweep voltage to said cathode ray tube during each raster only at the time said electron beam sweeps over a selected one of said predetermined sites, said horizontal sweep voltage having a duration shorter than the time required to generate each said raster.

19. The method of claim 17 wherein said step of energizing said integrated circuit with a pulsating input signal comprises applying an input pulse to said circuit when said electron beam impinges on a selected one of said predetermined sites.

20. The method of claim 18 wherein said step of energizing said integrated circuit with a pulsating input signal comprises applying an input pulse of shorter duration than said horizontal sweep voltage to said circuit during generation of each said raster when said electron beam sweeps over said selected one of said predetermined sites.

21. The method of claim 17 wherein said step of directing an electron beam upon predetermined sites on said electron beam in raster fashion over said integrated circuit; said step of energizing said integrated circuit with a pulsating input signal comprises applying an input pulse to said circuit during generation of each said raster when said electron beam impinges on a selected one of said predetermined sites; and said step of deflecting the cathode ray of a cathode ray tube includes the steps of deriving a voltage in accordance with the rate at which secondary emission electrons are detected at each of said two separate locations, sampling during alternate horizontal sweeps of said cathode ray the sum of the voltages derived from the detected secondary emission electrons and the voltage of said input pulse respectively, and deflecting said cathode ray in accordance with the sampled voltages.

22. A method of testing integrated circuits by mapping electric potentials thereon on the face of a cathode ray tube, said method comprising:
   energizing an integrated circuit with a plurality of input pulses to alter the electric field generated by said integrated circuit;
   sweeping in synchronism with said input pulses an electron beam in raster fashion over the area of said integrated circuit to be mapped to generate secondary emission electrons from said integrated circuit;
   detecting secondary emission electrons emanating from said integrated circuit at a rate determined by the interaction of said secondary electrons with the electric field generated by said integrated circuit;
   generating a raster on the face of said cathode ray tube in synchronism with the raster swept by said electron beam; and
   modulating the intensity of the raster on the face of said cathode ray tube, in accordance with changes in the rate at which the secondary emission electrons are detected.

23. The method of testing integrated circuits of claim 22 wherein said step of detecting secondary emission electrons emanating from said integrated circuit is performed at two separate locations, and said step of modulating intensity of the raster on the face of said cathode ray tube comprises amplitude modulating said intensity in accordance with the difference in the rates at which secondary emission electrons are detected at each of said two separate locations.

24. The method of testing integrated circuits of claim 22 wherein said step of detecting secondary emission electrons emanating from said integrated circuit is performed at two separate locations, and said step of modulating intensity of the raster on the face of said cathode ray tube comprises amplitude modulating said intensity in accordance with the sum of the rates at which secondary emission electrons are detected at each of said two separate locations.

25. Apparatus for testing circuits comprising:
   a source of electrons;
   means directing electrons from said source onto a surface of a circuit being tested in sufficient intensity to generate secondary electrons therefrom; pulse means coupled to the input of said circuit for producing a variation in the electric field generated by said circuit;
   electron detector means situated to intercept at least a portion of said secondary emission electrons emanating from the surface of said circuit; said detector means intercepting said secondary emission electrons at a rate determined by the interaction of said secondary electron with the electric field generated by said circuit;
   display means for monitoring performance of said circuit; and
   means synchronizing presentation of the image on said display means to displacement of electrons from said source over the surface of said circuit.

26. The apparatus of claim 25 including means coupled to said display means for modulating intensity of the image presented by said display means in accordance with changes in the rate at which secondary emission electrons impinge on said electron detector means.

27. The apparatus of claim 25 wherein said electron detector means situated to intercept at least a portion of secondary emission electrons emanating from said surface comprises a pair of electron detectors positioned on either side of the location on said surface being struck by electrons from said source.

28. The apparatus of claim 26 wherein said electron detector means situated to intercept at least a portion of secondary emission electrons emanating from said surface comprises a pair of electron detectors positioned on either side of the location on said surface being struck by electrons from said source.

29. The apparatus of claim 25 wherein said display means comprises a first cathode ray tube displaying a map of surface potentials on said circuit over the area thereof struck by a beam of electrons emerging from said source of electrons, and a second cathode ray tube for monitoring the surface potential at any point on said circuit.

30. The apparatus of claim 27 wherein said display means comprises a first cathode ray tube displaying a map of surface potentials on said circuit over the area thereof struck by a beam of electrons emerging from said source of electrons, and a second cathode ray tube for monitoring the surface potential at any point on said circuit.

31. The apparatus of claim 29 including means coupling said pulse means to said second cathode ray tube for synchronizing occurrence of displays on said second cathode ray tube to the repetition rate of said pulse means.

32. The apparatus of claim 30 including means coupling said pulse means to said second cathode ray tube for synchronizing occurrence of displays on said second cathode ray tube to the repetition rate of said pulse means.

33. The apparatus of claim 30 wherein said means synchronizing presentation of the image includes signal selection means for selectively combining output signals from said electron detector means, electronic switching means, means coupling said pulse means and said signal selector means to respective inputs of said electronic switching means, and means coupling the output of said electronic switching means to said second cathode ray tube.

34. The apparatus of claim 31 including means coupled to said second cathode ray tube for providing an expanded sweep therefor.

35. The apparatus of claim 33 including means coupled to said second cathode ray tube for providing an expanded sweep therefor.

References Cited

UNITED STATES PATENTS

| | | | |
|---|---|---|---|
| 3,329,813 | 7/1967 | Hashimoto | 250—49.5 |
| 3,373,353 | 3/1968 | Harris | 324—54 |
| 3,436,651 | 4/1969 | Helms | 324—51 |

RUDOLPH V. ROLINEC, Primary Examiner

E. F. KARLSEN, Assistant Examiner

U.S. Cl. X.R.

250—49.5; 324—51, 73